B. J. COLLINS.
FRONT WHEEL DRIVE FOR MOTOR VEHICLES.
APPLICATION FILED JUNE 27, 1917.
1,257,676.
Patented Feb. 26, 1918.
3 SHEETS—SHEET 2.
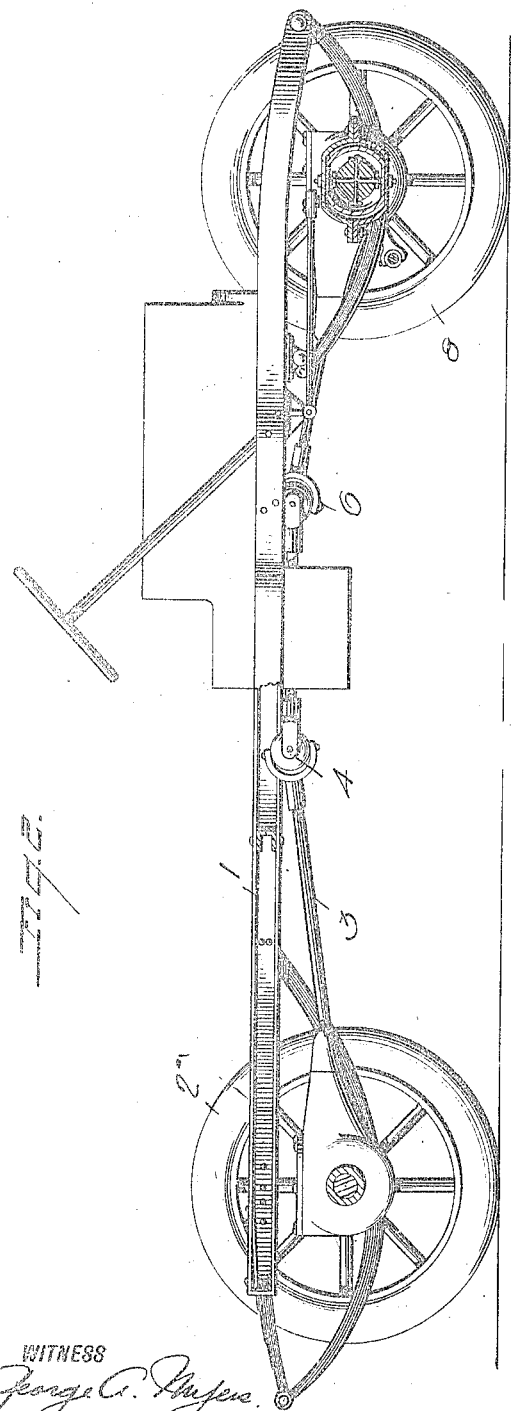
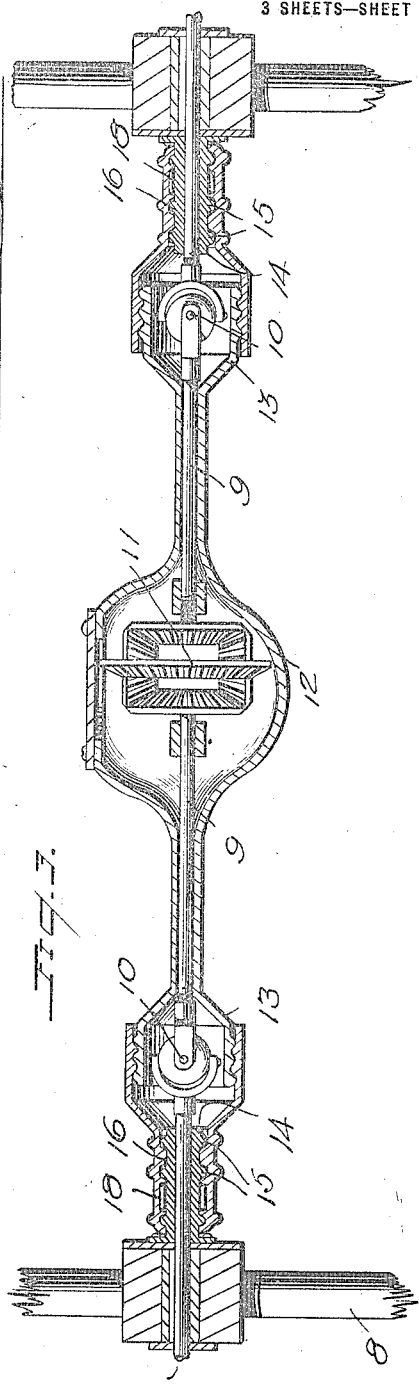
WITNESS
INVENTOR
BERT J. COLLINS
BY
ATTORNEYS B. J. COLLINS.
FRONT WHEEL DRIVE FOR MOTOR VEHICLES.
APPLICATION FILED JUNE 27, 1917.
1,257,676.
Patented Feb. 26, 1918.
3 SHEETS—SHEET 3.
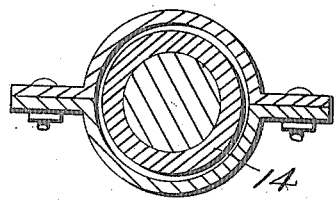
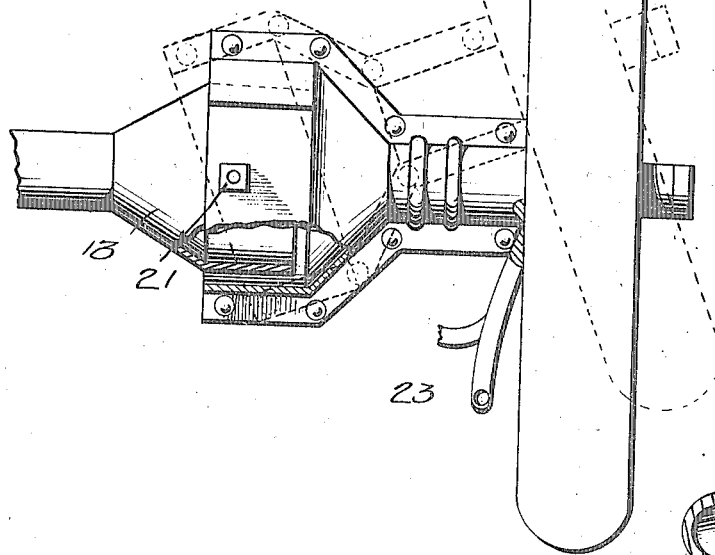
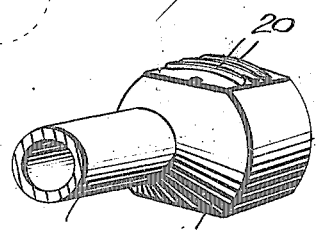
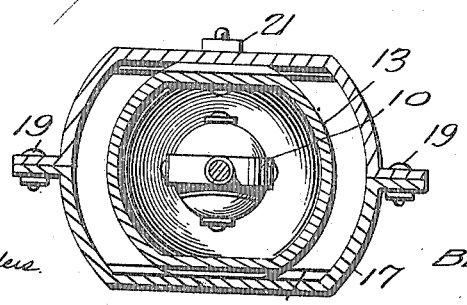
WITNESS
George C. Myers
INVENTOR
BERT J. COLLINS
BY
ATTORNEYS

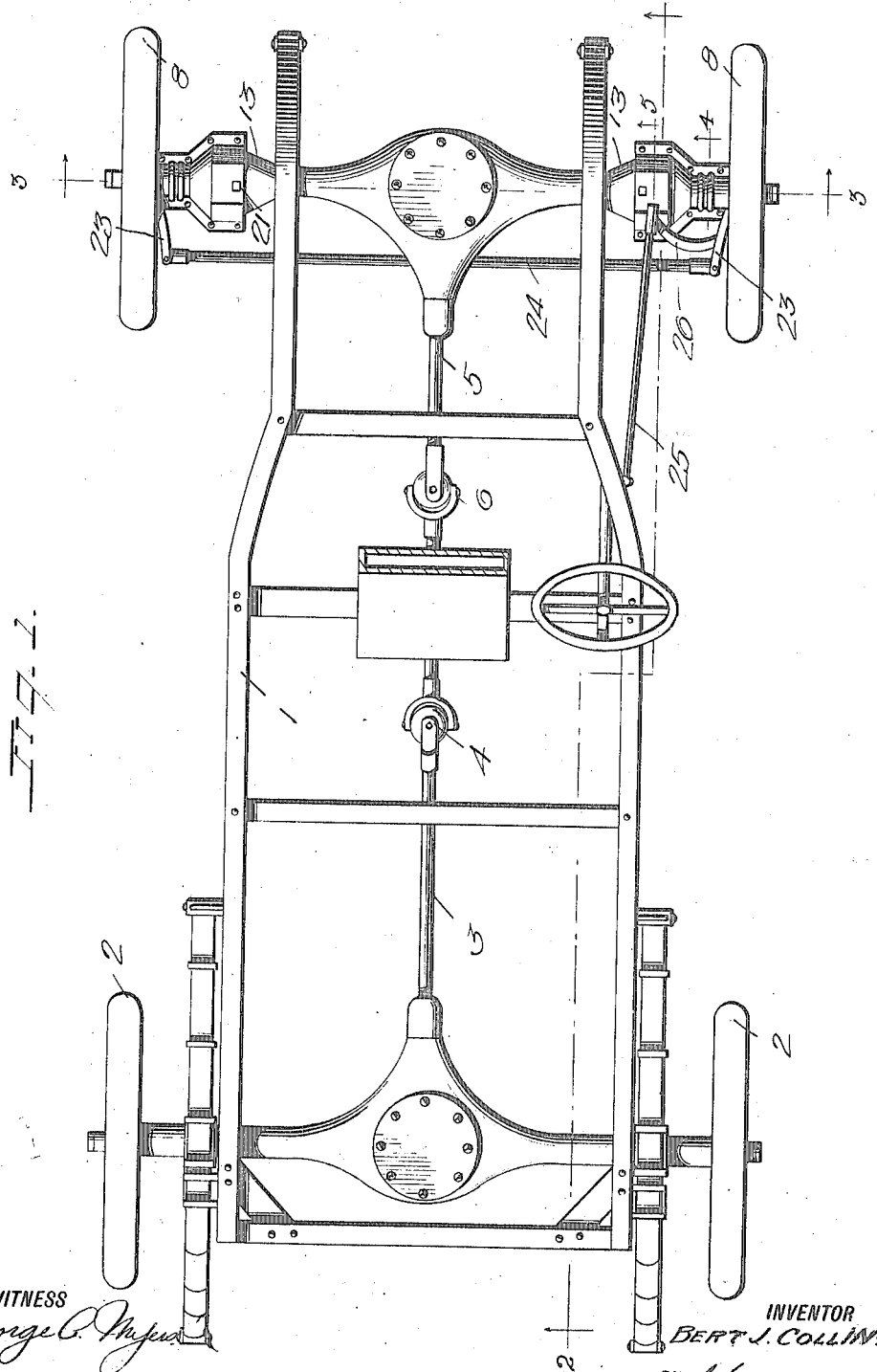

UNITED STATES PATENT OFFICE.

BERT J. COLLINS, OF LENORA, OKLAHOMA.

FRONT-WHEEL DRIVE FOR MOTOR-VEHICLES.

1,257,676.  Specification of Letters Patent.  Patented Feb. 26, 1918.

Application filed June 27, 1917.  Serial No. 177,229.

*To all whom it may concern:*

Be it known that I, BERT J. COLLINS, a citizen of the United States, and a resident of Lenora, in the county of Dewey and State of Oklahoma, have invented certain new and useful Improvements in Front-Wheel Drives for Motor-Vehicles, of which the following is a specification.

My invention is an improvement in front wheel drives for motor vehicles, and has for its object to provide a simple, inexpensive and efficient mechanism of the character specified, for connecting the motor directly with the front wheels to provide a four wheel drive.

In the drawings:

Figure 1 is a plan view of the improved drive;

Figs. 2, 3, 4 and 5 are sections on the lines 2—2, 3—3, 4—4 and 5—5, respectively, of Fig. 1, each view looking in the direction of the arrows adjacent to the line.

Fig. 6 is a front view of one wheel and connected parts, with parts broken away; and Fig. 7 is a perspective view of the enlargement of the axle housing.

The present embodiment of the invention is shown in connection with a motor vehicle 1, having the usual rear wheels 2 driven from a motor (not shown) through a transmission shaft 3 which connects with the differential between the sections of the rear axle in the usual manner.

A universal joint 4 is interposed in the length of the transmission shaft 3, and a second transmission shaft 5 extends forwardly from the motor to the front axle, a universal joint 6 being interposed in the length of the said transmission shaft. The spindles 7 of the front wheels 8 are connected to axle sections 9 by universal joint connections 10, and these axle sections are connected by a differential 11. A housing 12 incloses the differential and the axle sections, and the ends of the housing are enlarged, as shown at 13, to form one section of the housing for the universal joint.

A sleeve 14 is secured on each spindle, and is secured to the hub of the adjacent wheel, and each of these sleeves is provided with three annular ribs 15, one rib near each end and one intermediate the ends of the sleeve. These ribs engage in annular grooves 16 in a housing 17 which encircles the sleeve 14, and the housing has its inner end enlarged to engage about the adjacent enlargement 13 of the housing 12. A roller bearing 18 is arranged between each housing 17 and the sleeve 14, and the housings 17, are sectional as shown more particularly in Figs. 5 and 6, the sections being secured together by bolts 19 which are passed through abutting outwardly extending flanges on the housing sections.

The enlargement 13 is flattened at its top and bottom, as shown in Fig. 7, and a series of arc shaped ribs 20 is provided on these flattened portions. These ribs have the pivotal connection 21 between the housings as their center, and the housing 17 has internal grooves 22 in which the ribs 20 engage. Thus the housing sections turn with respect to each other, as shown in dotted lines in Fig. 6. The ribs and grooves coöperate to form guides and also to prevent displacement of the sections with respect to each other.

Guide arms 23 for the front wheels are secured to the housings 13 and they are connected by the usual connecting link 24. The steering mechanism indicated at 25 is of the usual construction, being connected to the operating arm 26 on one of the wheels. The front wheels may be turned as indicated in dotted lines in Fig. 6, the housings 12 and 17 moving upon each other, while at the same time the wheels are driven from the motor, thus providing a four wheel drive.

I claim:

1. In a motor vehicle, the combination with the front wheels of the vehicle, of spindles to which the wheels are secured, sleeves on the spindles, said sleeves having annular external ribs, housing sections for the spindle having annular internal grooves in which the ribs engage, a sectional front axle, a differential connecting the sections, a universal joint connection between each section and the adjacent spindle, a housing for the axle sections and the differential, said housing having its ends enlarged to form the inner section of the universal joint connection, said enlargements being flattened above and below and having arc shaped ribs on the flattened portions, the housings for the spindles having enlargements at their inner ends fitting over the enlargements of the axle housing, said enlargements having internal grooves engaging the ribs and the sections being pivoted together to permit the wheels to swing.

2. In a motor vehicle, the combination with the front wheels of the vehicle, of spindles to which the wheels are secured, housing sections for the spindle, a sectional front axle, a differential connecting the sections, a universal joint connection between each section and the adjacent spindle, a housing for the axle sections and the differential, said housing having its ends enlarged to form the inner section of the universal joint connection, said enlargements being flattened above and below and having arc shaped ribs on the flattened portions, the housings for the spindles having enlargements at their inner ends fitting over the enlargements of the axle housing, said enlargements having internal grooves engaging the ribs and the sections being pivoted together to permit the wheels to swing.

3. In a motor vehicle, the combination with the front wheels, of spindles to which the wheels are secured, an axle having universal joint connection with the spindle, a housing for the axle, a housing for each spindle, the housings for the spindles fitting over the adjacent ends of the housings for the axle, and said housings having interengaging arc shaped grooves and ribs, and the housings being pivoted together, for the purpose specified.

BERT J. COLLINS.